June 4, 1957 — N. J. GOLDEN ET AL — 2,794,952
WITHIN LIMITS FREQUENCY RESPONSE TESTER
Filed Sept. 30, 1953 — 6 Sheets-Sheet 1

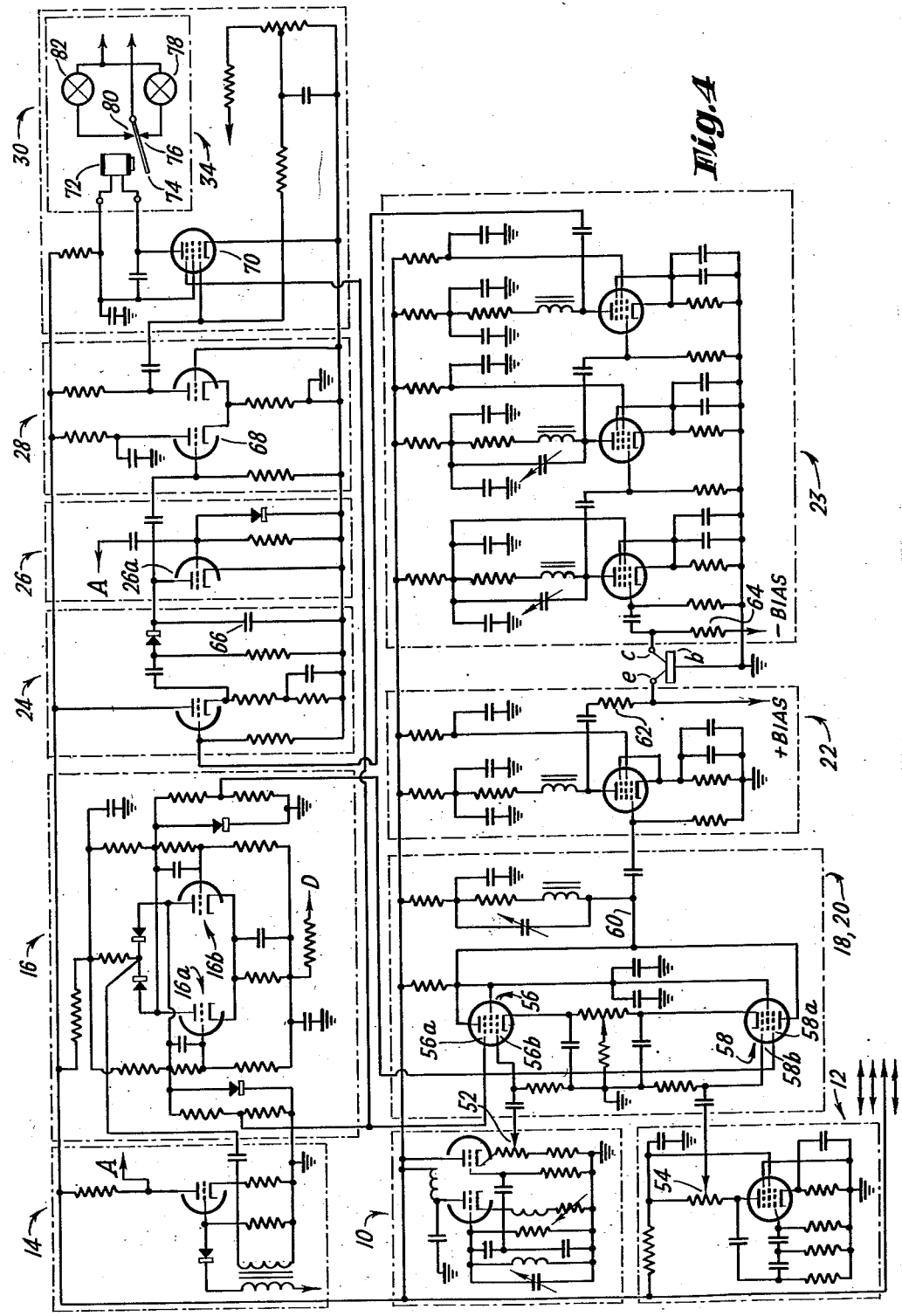

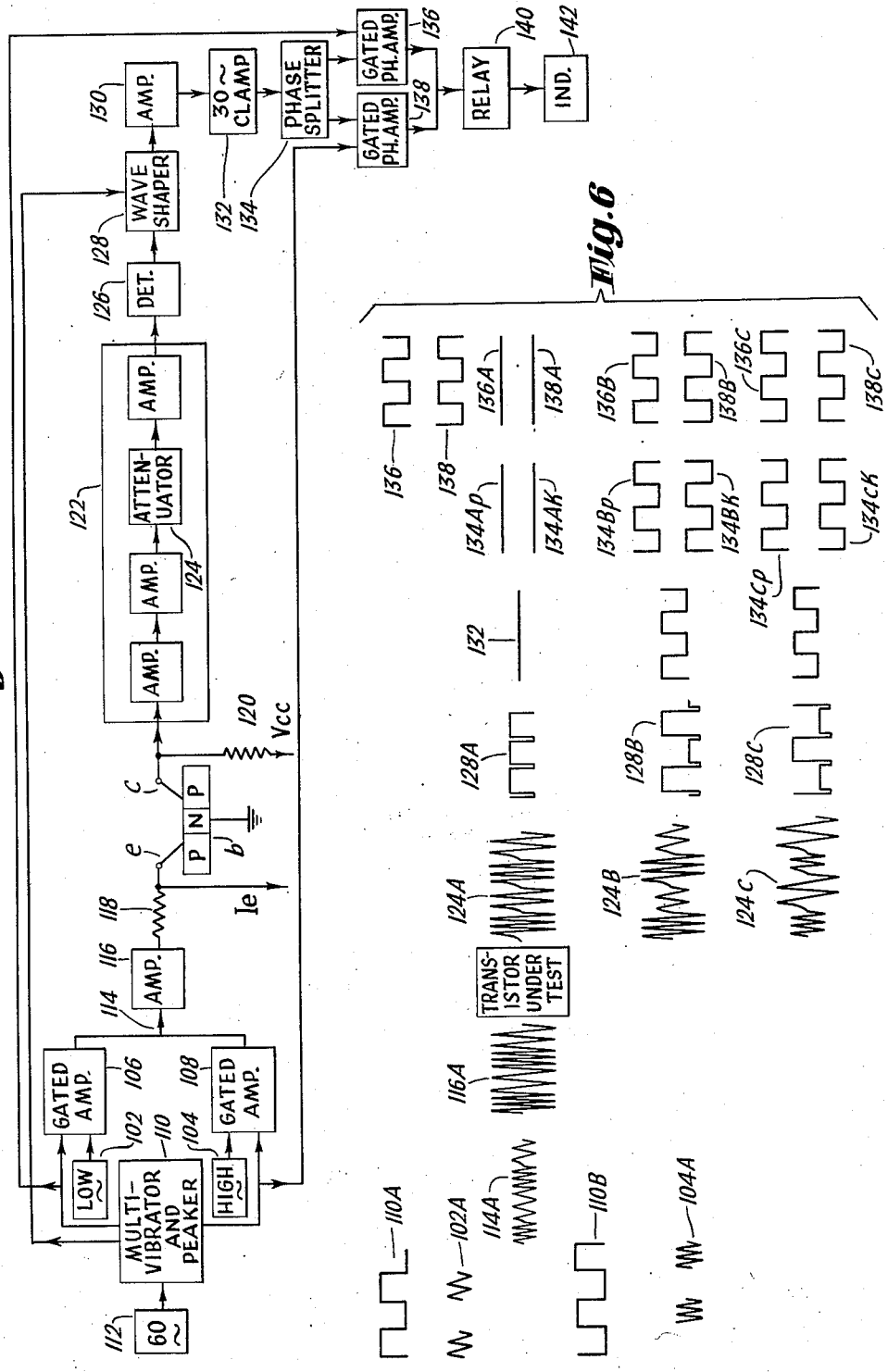

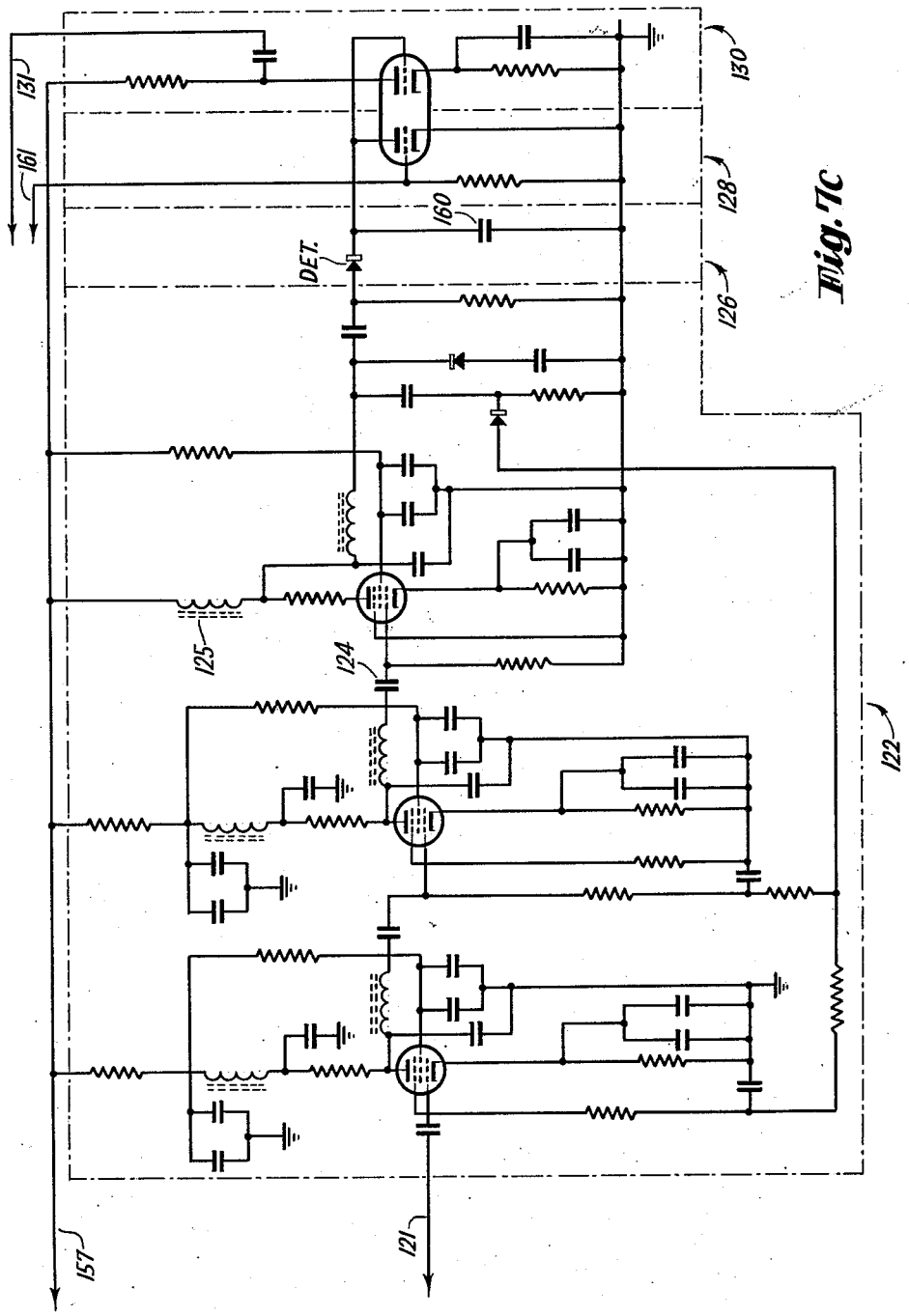

United States Patent Office 2,794,952
Patented June 4, 1957

2,794,952

WITHIN LIMITS FREQUENCY RESPONSE TESTER

Norman J. Golden, Marblehead, Mass., and Ants T. Piip, South Bend, Ind., assignors to Sylvania Electric Products Inc., a corporation of Massachusetts Application September 30, 1953, Serial No. 383,332

16 Claims. (Cl. 324—57)

This invention relates to a comparator to determine the response of a transducer at a selected test frequency in comparison to that which it has at a reference frequency and to give an indication of the result of that comparison.

The invention has particular application to transistor testing. This is effective to determine whether the transistor has a current gain at a given high frequency in proper proportion to that which it has at a lower reference frequency.

As is well known, as the frequency applied to a transistor increases, there is a falling off in current gain or alpha, the slopes for different transistors varying widely due to many contributing factors. For any number of randomly selected transistors the ratio of the alphas at a selected frequency to a given reference frequency also varies widely. A common specification of the frequency response of transistors depends on their performance at a low reference frequency such as 10K C. P. S. and at a much higher frequency such as 3M C. P. S. If at the higher frequency the current gain for example does not drop off more than .707, i. e., 3 db, from its gain at a lower fixed reference frequency then it may be regarded as acceptable from the frequency standpoint. The 3M C. P. S. selected is regarded as the particular cut-off frequency for the particularly desired transistor and the 3 db down response at that frequency is the selected alpha cut-off.

It is an object of my invention to be able to evaluate the frequency merit of a transistor without obtaining any absolute determination of current response at any given frequency, the merit being determined solely on the basis of automatic comparison of performance of the transistor at a reference frequency and at a selected higher frequency. Stated otherwise, the present invention provides for rapidly testing electrical devices, to determine whether they do or do not meet a set standard of comparative performance at a test frequency in relation to their performance at a reference frequency. A direct "go" or "no-go" unitary result is obtained from the test.

It should be understood that while a transistor is here shown under test, and the above discussion in the main applies to transistors, obviously any electrical device and any network, as an audio amplifier, may be similarly tested and the invention is not limited to transistor testing.

In general, the method herein employed in testing transistors is to apply a train of bursts of oscillations of alternately high and low frequency which may initially be of unequal magnitude so that the low frequency oscillator output is 3 db down from the high frequency output, and subsequently comparing the two frequency outputs from the transistor for magnitude, or to apply to the transistor under test a train of bursts of oscillations of alternately high and low frequencies of equal magnitude and subsequently after passage through the transistor, attenuating 3 db down the low frequency burst and then comparing the two resultant frequency outputs for magnitude. The methods also involve gating the bursts and correlating by gating the resultant output indication from the tester with the respective gated-in high and low frequency bursts.

For a fuller understanding of the invention, attention is directed to the following description and claims and to the drawings accompanying the same.

In said drawings

Fig. 4 is a schematic wiring diagram of the tester.

Fig. 5 is a block diagram of another form of tester for carrying out my invention.

Fig. 6 represents various waveforms which may appear at various points in the second form of tester, and Fig. 7, 7a, 7b, and 7c is a schematic diagram of the second form of tester.

Figure 1:
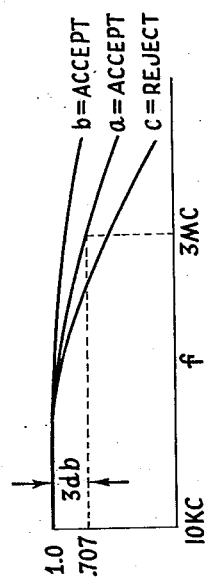
Fig. 1 is a diagram in explanation of what is to be accomplished by the illustrative tester of the invention.

Referring to the drawings more in detail, consider Fig. 1. A graph is here represented of the response vs. frequency of three transducers with particular emphasis as to the response at a specified operating frequency of 3M C. P. S. and contrasting the same with its response at a much lower reference frequency, here indicated as 10K C. P. S. Consider a point which has an abscissa value of 3M C. P. S. and which has a relative ordinate value of .707 (i. e., 3 db down from the unit ordinate). Curve $a$ represents the frequency response of a transducer of which the cut-off is exactly opposite the 3M C. P. S. mark and which would be an acceptable transducer. So would a transducer whose response corresponds to curve $b$, since its cut-off is beyond 3M C. P. S. However, a transducer whose response following curve $c$ falls short of the response it should have at the selected high frequency would be rejected. The test devices and methods described hereinafter indicate directly which transducer should be accepted and which should be rejected.

The device tested in each of the illustrative embodiments of the invention is subjected to a standard or reference frequency signal and to a test cut-off frequency signal; and in addition to the selective action of the test device, the system imparts a preferential transmission of 3 db favoring the test frequency over the reference frequency. A one-to-one comparison of the signal amplitudes yields a direct "accept" or "reject" test result that evaluates the frequency response characteristic. The actual value of response at each frequency is ignored in this test; it is only the sense of the changed response and the timing of the change that is significant.

Figure 2:
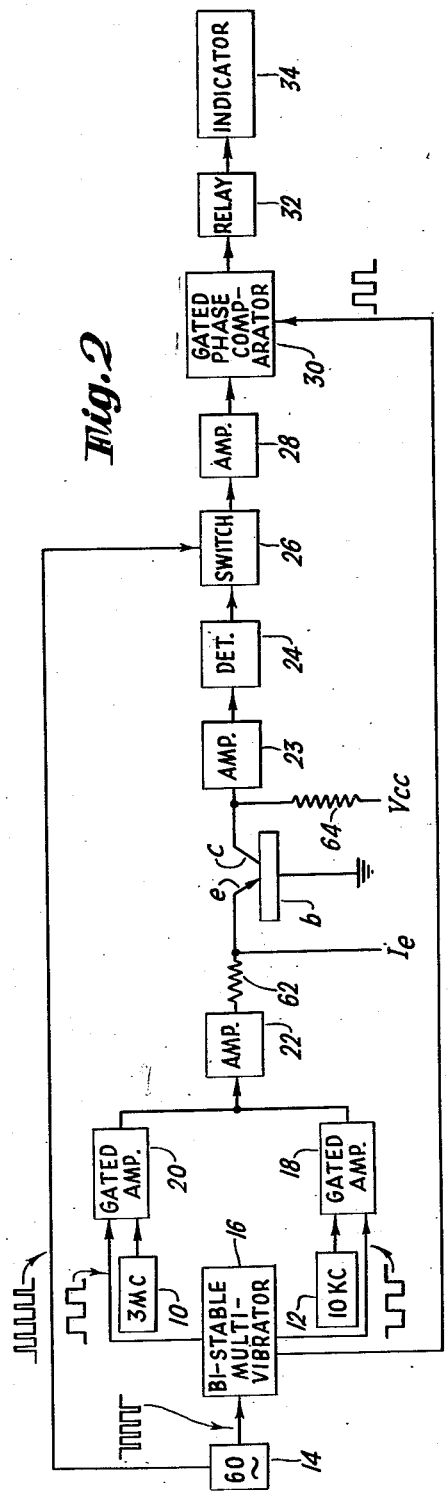
Fig. 2 is a block diagram of one form of tester for carrying out the invention.

In the block diagram of Fig. 2 is illustrated a form of tester in which there are two oscillators, 10 and 12, which for simplicity of discussion are disclosed as oscillating at 10K C. P. S. and 3M C. P. S. In this apparatus, the lower frequency oscillator is adjusted to have an output magnitude .707 times that of the higher frequency oscillator. Subsequently the output at the higher frequency as attenuated by the transistor under test is compared directly with the magnitude of response at the lower frequency.

There is provided a 60 C. P. S. vibrator 14 triggering a bi-stable multivibrator 16 which is therefore operated at 1/30 second intervals. The outputs of the multivibrator and of the oscillators are fed to two gated amplifiers 18 and 20 so that at 1/30 second intervals bursts of 10K C. P. S. oscillations and 3M C. P. S. oscillations respectively pass through the gated amplifiers and, in alternation, on to an amplifier 22. Thence the train of alternate oscillations pass on to the emitter $e$ of the transistor via a resistance device 62 large in comparison to the input resistance of the transistor to convert the signal voltage trains into signal current trains. From the collector c of the transistor, the signal is taken from a current measuring resistance 64 and thence passes through an amplifier 23 and a detector 24. The envelope obtained from the detector passes to a switch 26, under control of the 60 C. P. S. vibrator 14, and is shaped or squared if other than a straight line, as will be discussed hereinafter. The square wave if present is then amplified by the amplifier 28 and is applied to a gated phase detector 30 which operates in phase with the gating of the high frequency gated amplifier 20 and out of phase with the low frequency gated amplifier 18. If the voltage from amplifier 28 as impressed on the gated phase detector 30 is not negative-going when the gated amplifier 20 is pulsed, relay 32 and acceptance device 34 are energized. Otherwise the device will remain undisturbed and will thus indicate the rejection of the transistor under test.

Now consider the forms of the waves or pulses that are transmitted through the tester.

The bursts of oscillations being fed to the amplifier 22 and to the emitter of the transistor enter at equal intervals but are of two frequencies which arrive in alternation, with the lower frequency bursts adjusted to be .707 in magnitude of the high frequency bursts. Thus initially the applied magnitudes are 3 db apart. However, the train which leaves the collector of the transistor does not have bursts of the same magnitude as before. The diverse frequency bursts may be of equal magnitude as shown at 3–1 of Fig. 3 or of unequal magnitude. And the unequal magnitude may represent either the high frequency oscillations greater than the low frequency oscillations as shown at 3–2 or the reverse as shown at 3–3.

After detection the oscillations 3–1 will appear essentially as a straight line as indicated at 3–1d, while the envelopes of oscillations 3–2 and 3–3 will appear as at 3–2d and 3–3d, essentially square waves, with the high values 180° out of phase with each other. Note that detected envelopes 3–3d represents a transistor not up to the selected standard and it is the office of the gated phase comparator to cause the indicator to show that this transistor should be rejected or, by means of a suitable sorting device, actually to reject the same while those affording wave forms corresponding to 3–1d and 3–2d should be accepted. The drawings show the phase relationship existing at different points, and the acceptable transistors can be picked out by the observer. But to the comparator 30, the phase relationship exists only because the gating "on" thereof is in phase with the gating "on" of the amplifier 20 by the multivibrator 16. The gated phase comparator will be maintained inoperative under two conditions. One when it is not triggered by the multivibrator 16, and the other when the negative going portion of the square wave of 3–3d (disregarding the momentary dips produced by switch 26) is coincident with the triggering "on" by the multivibrator. When either the voltage represented by the envelope of figure 3–1d or the positive going phase of envelope 3–2d is impressed on the comparator at the instant that the comparator is triggered by the vibrator, the relay 32 will be operated. The switch 26 has a short circuiting element within it, controlled by 60 C. P. S. pulses from the oscillator 14 to short out and discharge the condenser in the detector at the end of each burst of rectified oscillations.

Now consider the schematic of Fig. 4. Herein the various sections having the functions shown in the block diagram of Fig. 2 are designated by the same reference character applied to the dotted lines surrounding the elements.

No detailed description of parts will be given except where necessary, since, for the most part, the blocks entering into the composition of the invention contain well known functioning devices and the invention is not concerned with any individual element.

The high frequency oscillator in block 10 comprises a Colpitts oscillator feeding into a cathode follower. The cathode follower is employed to prevent loading of the oscillator which would tend to change its frequency and amplitude of oscillations. The signal output voltage of the oscillator may be adjusted by adjustment of the potentiometer 52 in the cathode circuit of a cathode follower. The oscillator and cathode follower may both be in one envelope such as a type 12AU7.

The low frequency oscillator in block 12 is a conventional phase shift oscillator which is stable in frequency and amplitude at the low reference frequency selected. This oscillator has a potentiometer 54 in the plate circuit to adjust its output. The type tube employed may be a 6AU6. The potentiometers 52 and 54 are so adjusted that the voltage magnitude derived from the low frequency oscillator is .707 that derived from the high frequency oscillator.

In Fig. 4, the alternately gated amplifiers are both shown in a common block designated as 18, 20, and these comprise a pair of pentodes, 56 and 58. Each pentode has a close wound suppressor grid 56a, 58a connected independently of other elements of the tube so that these grids may be used as gating elements. These pentodes may be type 6AS6. The signal from the high frequency oscillator is fed to the #1 grid 56b of the gated amplifier tube 56, and the signal from the low frequency oscillator is fed to the #1 grid 58b of the tube 58. The outputs from these tubes are fed to a common line 60. The alternate gating of the two pentodes is controlled by a multivibrator 16 of the bistable type triggered by the 60 C. P. S. pulser 14. The type tubes employed may be respectively a 12AU7 and half of a 12AX7. The pulser supplies rectified and amplified pulses to the multivibrator to trigger the same whereby the output of each section is a 30 C. P. S. square wave and the square wave from section 16a is 180° out of phase with that of section 16b. The positive-going or "on" pulses are applied alternately to the suppressor grid of the high frequency gating tube 56 and to the suppressor grid of the low frequency gating tube 58. With the applied voltages as indicated on the diagram, sufficient negative bias (in the order of −40 volts) will be supplied to the gating tubes 56 and 58 to cut them off regardless of the signal voltages applied to the control grids of these tubes from the oscillators. Therefore, alternate trains of oscillations of the low and the high frequencies will appear in line 60, each frequency appearing at 1/30 sec. intervals. This signal is fed to a conventional pentode amplifier 22 utilizing a 6AN5 in whose output circuit is coupled the emitter, e, of the transistor under test via resistor 62, the base, b, of the transistor being "grounded" and the emitter being positively biased with respect to the base to control the flow of current in the output of the transistor. For the purpose of illustration a p-n-p type of transistor has been selected. In order to make the transistor look back into what looks like a current supply the resistor 62 has a high value, as 75,000 ohms, compared to the input resistance of the transistor.

The collector, c, of the transistor is negatively biased through a low value resistor 64, e. g. one having a value of 200 ohms, to approximate a short circuit for the transistor output to thereby enable measurement of its short circuit current gain. The signal taken from resistor 64, representing current variations in the collector c, is transmitted to a three stage broad band amplifier 23 and then on to the detector 24 and switch and wave shaper 26. The detector 24 is a conventional peak rectifier, energized by an input cathode follower. Condenser 66 of the detector is momentarily shorted by switch tube 26a, as a half of a 12AU7, triggered by the positive going pulse of 60 C. P. S. oscillator 14 to discharge the condenser after each test frequency burst and thereby clears the detector to respond only to each new input burst of oscillations. The detected signal is then fed to a standard cathode-follower and grounded-grid amplifier combination 28, that form of amplifier being particularly effective for transmitting and amplifying low frequency square waves. The tube 68 used may be a 12AX7.

The output of the amplifier is then fed to the comparator 30 and relay 32 with its indicator 34. The comparator may use a 6AS6 type of pentode 70 with the square-wave signal fed to the #1 grid of the tube, the tube being gated at the #3 grid by having gating "on" pulses from the multivibrator 16 applied to it simultaneously with the application of a gating "on" pulse to the high frequency response gating amplifier tube 56.

Figure 3:
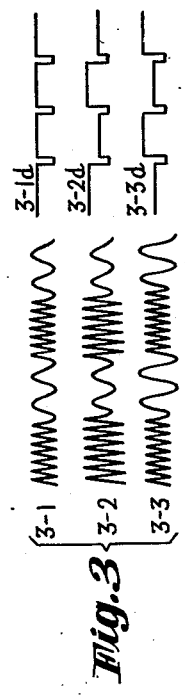
Fig. 3 represents various waveforms which may appear at various points in the tester.

As explained previously, if when the gating "on" pulse is received from the multivibrator the signal from the detector is not negative going, the relay 32 and indicator 34 will be operated. If the detector output pulse be negative going the gating tube 70 will be cut off because of the negative bias imposed on grid #1. Even though the response of the comparator might appear to be governed solely by the high-frequency performance of the transistor and by the high frequency performance of the whole system, such is not the case; for the signal transmitted to comparator 30 can be negative-going or positive-going, during "on" intervals of tube 70, only as compared to the transistor and test system performance during the "off" intervals of tube 70. The R. C. combination connected to the No. 1 grid of the tube 70 provides a reference voltage so that if a pulse lower in value than the charge on the condenser of the R. C. combination comes along (as when a transistor of type 3-3, Fig. 3, is under test) the tube 70 will be held inoperative, while if pulses above the reference level come along or at least no depressive voltage comes along, the tube 70 will be rendered operative when the gating pulse is applied to it. The condenser 66 is discharged periodically by the switch 26 to alter the wave form applied to the following tubes so that it is essentially square instead of triangular.

The output signal from the tube 70 is fed to a relay coil 72 associated with an armature 74 normally in contact with the terminal 76 leading to an indicator lamp 78 which may be of a type 47 and painted red. When the tube 70 is conductive, the armature 74 is picked up making contact with contact 80 leading to a second indicating lamp 82 which may also be a type 47 but painted green. Thus the indicator lamps will show whether a transistor or transducer under test is, or is not, acceptable.

In Fig. 5 there is shown in block diagram another form of certain aspects of the invention.

In this form the amplitudes of the applied oscillators at the two frequencies are made to be equal and the attenuation of the low frequency signal in relation to the high frequency signal is in the output signal from the transistor under test.

Also there is shown in this form of invention a somewhat different form of gating and phasing of the applied oscillations and of the transistor response than is shown in the modification of Fig. 4.

In Fig. 5 there is provided a low frequency oscillator 102 and a high frequency oscillator 104 adjusted to equal output amplitudes. The low frequency oscillator feeds into a gated amplifier 106 while the high frequency oscillator feeds into a second gated amplifier 108. The gating through these amplifiers is controlled by a combined bi-stable multivibrator and peaker 110 operative to gate "on" the two amplifiers 106 and 108 in alternation. A triggering oscillator 112 controls the flip-flop rate of the multivibrator. Preferably the triggering oscillator 112 operates at 60 C. P. S. and each tube 106 or 108 is thus gated "on" every 1/30 of a second. The train of alternate bursts of oscillations are fed to a common channel 114 and on to the amplifier 116, these bursts all being of the same magnitude.

The equal magnitude bursts are then fed via a resistor 118 to the emitter $e$ of the transistor under test, the current passing in series through the resistor and transistor so as to provide the emitter of the transistor under test with a signal current that is essentially independent of the transistor input resistance. The base $b$ of the transistor is grounded while the collector $c$ is very nearly shorted by a low value resistor 120 to a collector biasing voltage source. The signals from the collector are then fed to a broad band amplifier 122 tailored as a whole to favor the high frequency signal over the low frequency signal by a 3 $db$ difference in gain at the two frequencies. In this amplifier, as between the second and third stages, there is provided the small capacitance 124 to attenuate the low frequency signals, without appreciably affecting the high frequency signals. The signals are then passed on to a detector 126, a wave shaper 128, and through a further amplifier 130. Thence the signal is fed to a clamp 132 to fix the lower base level of the signals and from this the difference voltage of the signals is fed to a phase splitter 134. The split phases are then fed in push-pull relation to the comparator including two push-pull gated amplifiers 136 and 138 under control of the multivibrator and thence on to a relay 140 and indicator 142.

The wave forms of the pulses, their coordination and the wave forms of the signal at selected points in the system are shown in Fig. 6. The frequency bursts emanating from the low frequency oscillator are indicated at 102A in the figure and the frequency bursts emanating from the high frequency oscillator are indicated at 104A. The gating pulses fed to the gated amplifiers 106 and 108 are indicated as 110A and 110B. The train of waves appearing in line 114 is indicated as 114A and after passage through the amplifier 116 as 116A. The wave train as it appears after passing through the transistor under test and as further modified by attenuator 124 may take any one of three forms. The high frequency and low frequency oscillations may be of the same magnitude as indicated at 124A, or the high frequency oscillations may be greater than the low frequency oscillations as indicated at 124B or the high frequency oscillations may be smaller in magnitude than the low frequency oscillations as indicated at 124C. It should be remembered that in the last case the character of the transistor corresponds to that of the transistor indicated at $c$ in Fig. 1. After passing through the detector 126 and switch 128, the respective trains will appear as at 128A, 128B and 128C. At 132 the bottoms of the square waves will be clamped against drift to maintain the upper levels of the waves at proper relative positions.

At the phase splitter 134 the square waves will appear at the plate and cathode in push-pull arrangement. At the phase splitter the waves will appear as indicated at 134A$p$ and 134A$k$ at the plate and cathode, respectively, or as shown at 134B$p$, 134B$k$ or 134C$p$, 134C$k$. If the transistors have characteristics corresponding to curve $a$ in Fig. 1 then there will be no positive or negative pulses at the plate and cathode of the phase splitter. If the transistors have characteristics corresponding to curve $b$ or $c$ in Fig. 1 then square waves will appear. These square waves are fed to a gated phase detector which is gated in synchronism with the gated amplifiers 106, 108.

The signal 136A or 138A will not bias the amplifiers 136, 138 to cut-off and these will operate in push-pull manner as gating pulses are received; therefore the indicator relay 140 will be operated and the indicator 142 will indicate the transistor as an acceptable unit, termed a "go" test.

A positive going frequency response pulse 136B on amplifier 136 coincident with a positive synchronizing pulse on that amplifier would render the amplifier conductive and there would be a "go" indication on the indicator. Under such circumstances there would be, during the next 1/30 second, a positive going frequency response pulse 138B at amplifier 138 coincident with a positive synchronizing pulse on that amplifier, which would render that amplifier conductive and would sustain the "go" indication on the indicator. On the other hand a negative going pulse such as 136C coincident with a positive pulse from the vibrator would not render the amplifier 136 conductive and there would be a "no go" indication on the indicator 142. Correspondingly there would be, during the next 1/30 second, a negative going pulse 138C on amplifier 138 coupled with a positive going pulse on that amplifier from the multivibrator, and this would sustain the "no go" indication.

Figure 7A:
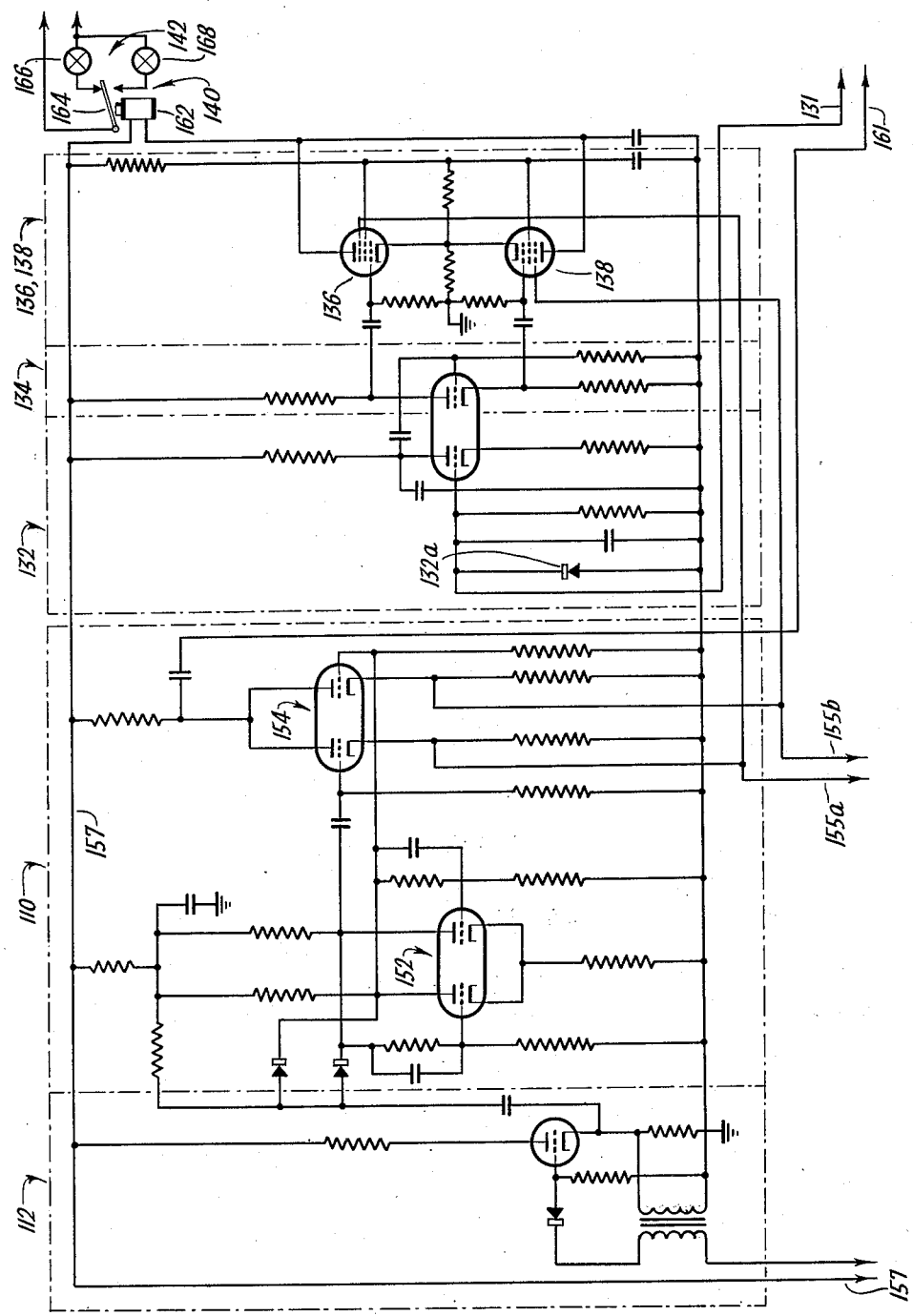
Figure 7B:
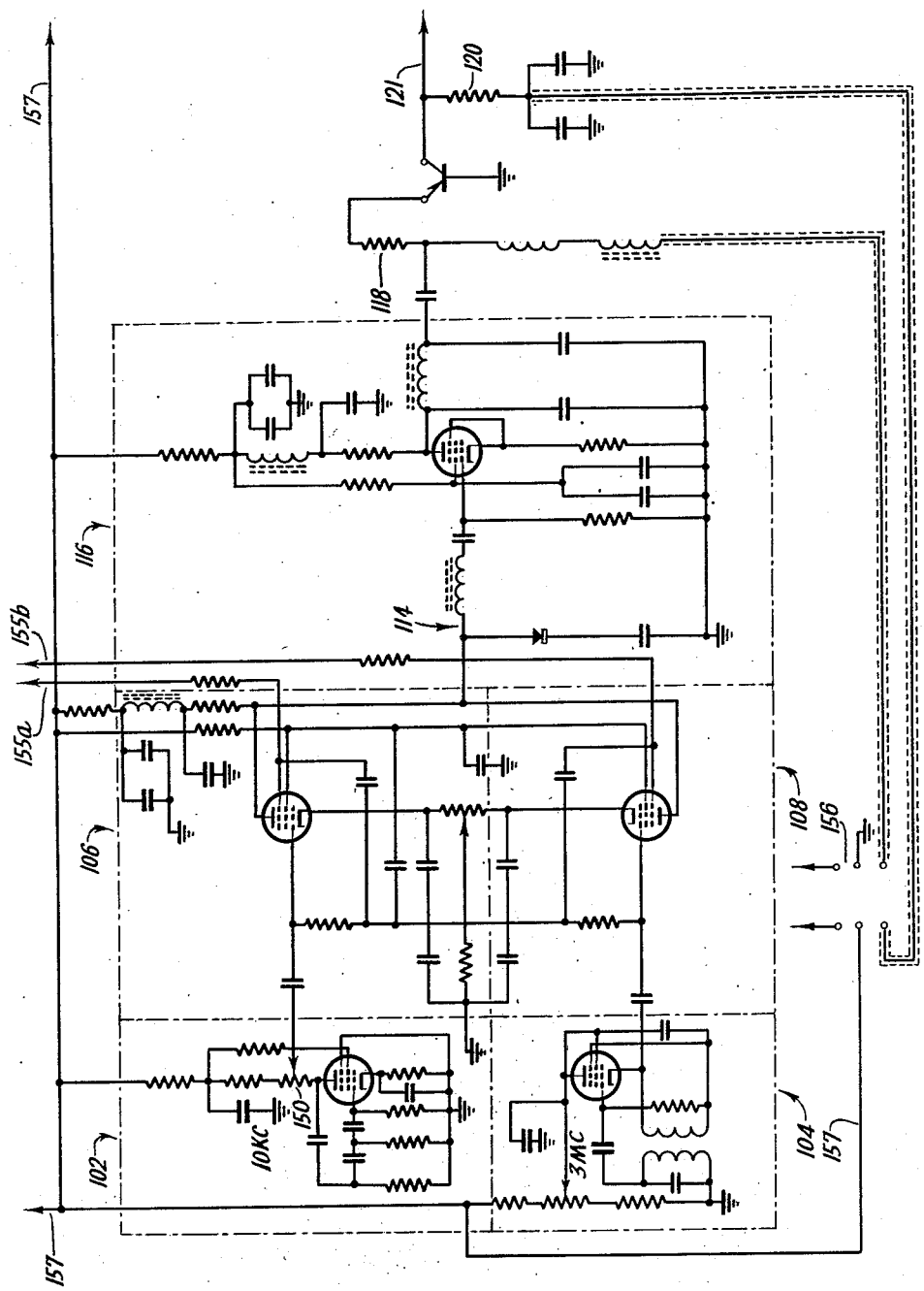

Fig. 7 shows in detail the electrical components entering into the construction of the various blocks of Fig. 5. Since the invention does not lie in the elements themselves, only a general description of parts constituting the blocks appears to be necessary for an understanding of the invention.

The low frequency oscillator 102, here shown as a type 6AU6 is of the phase shift type, while the high frequency oscillator 104, also a type 6AU6 is here shown as a Colpitts oscillator.

The low frequency oscillator is provided with a potentiometer 150 in the plate supply so as to tap off from the oscillator a voltage whose magnitude can be made equal to that obtained from the high frequency oscillator. The low frequency oscillator output is fed to the gated amplifier tube, a 6AS6, in block 106 while the high frequency output is fed to a similar tube in block 108. The gating of these tubes is controlled by a combined multivibrator and pulser 110 comprising a flip-flop multivibrator 152, shown as a type 12AU7, differentially coupled to peaker 154, also a type 12AU7 tube. The pulses from the cathodes of the peaker are fed via conductors 155a and 155b to the #3 or suppressor grids of the gated amplifiers 106 and 108, as well as to the push-pull amplifiers 136 and 138, as will again be pointed out in more detail. The flip-flop vibrator is triggered by the 60 C. P. S. oscillator 112, which may be a 12AX7. Since the pulses fed to the multivibrator are 60 C. P. S., like pulses from the multivibrator and peaker are 30 C. P. S.

The alternating outputs from the gated amplifiers 106, 108 are fed to the common line 114 and thence to an amplifier in block 116 which may be a type 6AN5. From the amplifier 116 the current flows through a comparatively high resistance 118 to the emitter of the transistor under test. The transistor is biased in conventional fashion by having leads leading to a connector 156 which couples in with grounded D. C. supplies, as required. The connector may also be connected with suitable plate supply 157 and heater supply sources. In the collector side of the transistor is the low resistance 120; and the fluctuating voltages appearing across this resistance is fed via conductor 121 to the three stage broad band amplifier in block 122, employing three 6AH6 type tubes in stagger tuned arrangement. Coupling the second to the third stage is a low value capacitor 124, high in impedance to the low frequency oscillations passing through the amplifier and low in impedance to the high frequency oscillations, and a choke 125 is included in the anode load to amplify the high frequency signals more than the low frequencies, so that the low frequency voltage amplitude would be 3 db down with respect to the amplitude of the high frequency voltage as indicated by curve a in Fig. 1. The low frequency oscillations, attenuated in relation to the high frequency signals as set forth above, are next fed together with the high frequency oscillations to the detector in block 126. The rectified voltages representing the succession of high and low frequency voltages appearing across the detector condenser 160 are removed every 1/60 sec. by trigger pulses from the peaker 154 via conductor 161, to switch 128 to prevent blocking the condenser. These pulses are developed in the peaker anode circuit as shown, and are of brief duration, corresponding to the time during which one of the peaker sections is being cut off while the other is being switched on. The voltages appearing on the condenser 160 are fed to the amplifier in block 130. The switch and amplifier may be in one envelope, here typified as a 12AT7. From the amplifier 130, the signals are fed via conductor 131 to a shaping amplifier 132, including clamping diode 132a that tends to eliminate the signal peaks produced by switch 128, and thence to the phase splitting tube 134 here illustrated as a part of a type 12AT7. The pulses from the phase splitter are applied to the #1 grids of push-pull gated phase-detector amplifiers 136, 138 here shown as a pair of 6AS6's. The #3 grids of these tubes are placed under control of the pulses applied to the pair of 6AS6's in blocks 106 and 108 and in synchronism therewith. The plate circuits of the phase-detector amplifier are in series with the coil 162 of relay 140 and if a certain minimum current is permitted to flow through the tubes, the armature 164 will be attracted to contact a terminal of the indicator 142 to give a "go" indication as by lighting a green lamp 166 or will not be attracted away from a contact leading to a "no go" red lamp 168.

Variations in the illustrative embodiments described above will be self evident to those skilled in the art. Thus it will be obvious that the system of Fig. 1 may be adjusted so as to impress equal amplitudes of the test frequencies on the test device, and in the amplifier the high frequency test signal may be preferentially transmitted, by a 3 db difference, in relation to the low frequency reference signal; and similarly the amplifier of the system in Fig. 5 may be of uniform frequency response while the input signal levels may be adjusted to have the desired 3 db differential. In place of a broad-band amplifier, it is apparent that in broad aspect two channels, each designed for a respective one of the frequencies involved, may be used with a suitable comparator. Consequently it is appropriate that the appended claims should be accorded a broad latitude of interpretation, consistent with the spirit and scope of the invention.

Having thus described our invention, what we claim is:

1. A tester comprising a low frequency oscillator, a high frequency oscillator capable of having an output equal to that of the low frequency oscillator, means for gating pulses of these oscillators with the pulses at the frequencies of said two oscillators in alternation into a common line, means for applying the gated alternate pulses to a transducer under test, means for deriving from the transducer, in alternation, two A.-C. voltages corresponding to the two frequencies applied to the transducer and of magnitudes in accordance with the frequency response of the transducer, means for rectifying the two voltages, means located in the tester in advance of the rectifying means for adjusting the amplitude of the low frequency oscillations in relation to that of the high frequency oscillations, and means under control of the rectified and adjusted pulses to indicate the relative response of the transducer to the two frequencies.

2. A transducer tester comprising a low frequency oscillator, a high frequency oscillator, means for gating pulses of these oscillators with the pulses at the frequencies of said two oscillators in alternation into a common line, means for applying the gated alternate pulses to a transducer under test, means for deriving from the transducer, in alternation, two A.-C. voltages corresponding to the two frequencies applied to the transducer and of relative magnitudes modified in accordance with the frequency response of the transducer, means for rectifying the two voltages, means located in the tester in advance of the rectifying means for adjusting the amplitude of the low frequency oscillations at 3 db below that of the high frequency oscillations, a gated phase detector energized by the rectifying means and operated in synchronism with the gating of the oscillations into the common line, and means under control of the gated phase detector to indicate the relative response of the transducer to the two frequencies.

3. A transducer frequency response tester comprising a source of low frequency oscillations, a source of high frequency oscillations, means for feeding the output of the two sources in alternation into a transducer under test, rectifying means and means for transmitting the output from the transducer to the rectifying means, a gated phase detector energized by said rectifying means, means for synchronously gating the input to the transducer and the gated phase detector, and a utilization device controlled by the gated phase detector.

4. A transducer frequency response tester comprising a low frequency oscillator, a high frequency oscillator, means for feeding the output of the two oscillators in alternation into a transducer under test, means for transmitting the output from the transducer to a rectifier, means located between the oscillators and the rectifier for depressing the low frequency oscillations from its value when a state of equality of output of the oscillators exists, means for detecting the envelope of the rectified output, means for synchronously gating the input to the transducer and the output of the detecting means, and means for feeding the so gated output to an indicator.

5. A transducer frequency response tester comprising a low frequency oscillator, a high frequency oscillator, means for feeding the output of the two oscillators in alternation into a transducer under test, means for deriving from the transducer, in alternation, two A.-C. voltages corresponding to the two frequencies applied to the transducer and of magnitudes in accordance with the frequency response of the transducer, means for rectifying the two voltages, means located between the oscillators and the rectifying means for depressing the low frequency oscillations from its value when a state of equality of output of the oscillators exists, means for detecting the envelope of the rectified output, means for synchronously gating the input to the transducer and the output of the detecting means, an indicator, and means for feeding the so gated output to said indicator.

6. A transducer frequency response tester comprising a low frequency oscillator, a high frequency oscillator, means for feeding the output of the two oscillators in alternation into a transducer under test, means for deriving from the transducer, in alternation, two A.-C. voltages corresponding to the two frequencies applied to the transducer and of magnitudes in accordance with the frequency response of the transducer, means for rectifying the two voltages, means located between the oscillators and the rectifier for depressing the low frequency oscillations 3 db from its value when a state of equality of output of the oscillators exists, means for detecting the envelope of the rectified output, means for synchronously gating the input to the transducer and the output of the detecting means, an indicator, and means for feeding the so gated output to said indicator.

7. A transducer frequency response tester comprising a low frequency oscillator, a high frequency oscillator, means for adjusting the outputs of the oscillators to enable the voltage of the low frequency output to be made lower in magnitude than that of the high frequency oscillator, means for transmitting to a transducer under test, in alternation, the so adjusted oscillator outputs, means for feeding the output of the transducer under test to a detector, means for feeding the output of the detector to a gated phase detector, means for gating the outputs of the oscillators in synchronism with the gating of the phase detector, and utilization means controlled by said detector.

8. A transducer frequency response tester comprising a low frequency oscillator, a high frequency oscillator, means for adjusting the outputs of the oscillators to enable the voltage of the output of the low frequency oscillator to be made lower in magnitude than that of the high frequency oscillator output, means for transmitting to a transducer under test, in alternation, the so adjusted oscillator outputs, a high resistance in series in said transmitting means, a low value resistor shunting the output of the transducer, a detector, means for transmitting the voltage developed across the low value resistor to and through said detector, a gated phase responsive device, means for transmitting the resulting detected envelope to said gated phase responsive device, means for gating the outputs of the oscillators in synchronism with the gating of the phase responsive device, an indicator, and means for feeding the output of said phase responsive device to said indicator.

9. A transducer frequency response tester comprising a low frequency oscillator, a high frequency oscillator, means for adjusting the outputs of the oscillators to enable the voltage of the low frequency output to be made lower in magnitude than that of the high frequency oscillator, a pair of gated amplifiers connected respectively with said oscillators, a bi-stable multivibrator connected to the gated amplifiers, a trigger connected to the multivibrator to operate the same whereby oscillation bursts, in alternation from each of the oscillators, may be passed through the amplifiers, means for transmitting to a transducer under test the alternating bursts of oscillations with the low frequency voltage lower in magnitude than the high frequency voltage, a detector, means for feeding the output of the transducer under test to said detector, a gated phase comparator, means for feeding the output of the detector to said gated phase comparator, said comparator being connected to and under control of the multivibrator and effective to transmit pulses only during the time the high frequency gated amplifier transmits bursts and coincidently when no negative going pulse from the detector output is applied to the comparator, an indicator, and means for feeding the output of said gated phase comparator to said indicator.

10. A transducer frequency response tester comprising a low frequency oscillator, a high frequency oscillator, means for adjusting the outputs of the oscillators to enable the voltage of the low frequency output to be made lower in magnitude than that of the high frequency oscillator, a pair of gated amplifiers connected respectively with said oscillators, a bi-stable multivibrator connected to the gated amplifiers, a trigger connected to the multivibrator to operate the same whereby oscillation bursts, in alternation from each of the oscillators, may be passed through the amplifiers, means for transmitting to a transducer under test the alternating bursts of oscillations with the low frequency voltage lower in magnitude than the high frequency voltage, a detector, means for feeding the output of the transducer under test to said detector, a detector short circuiting switch connected with the trigger to be operated each time the trigger operates on the multivibrator, whereby the detector is cleared for successive bursts of oscillations, a gated phase comparator, means for feeding the output of the detector, as affected by the switch, to said gated phase comparator, said comparator being connected to and under control of the multivibrator and effective to transmit pulses only during the time the high frequency gated phase amplifier transmits bursts and coincidently when no negative going pulse from the detector output, modified by the switch, is applied to the comparator, an indicator, and means for feeding the output of said gated phase comparator to said indicator.

11. A transducer frequency response tester comprising a low frequency oscillator, a high frequency oscillator, means for adjusting the outputs of the oscillators to enable the output voltage of the low frequency oscillator to be made lower in magnitude than that of the high frequency oscillator, a pair of gated amplifiers connected respectively with said oscillators, a bi-stable multivibrator connected to the gated amplifiers, a trigger connected to the multivibrator to operate the same whereby oscillator bursts, in alternation from each of the oscillators, may be passed through the amplifiers, means for transmitting to a transducer under test the alternating bursts of oscillations with the low frequency voltage lower in magnitude than the high frequency voltage, a high resistance in series in said transmitting means, a low value resistor shunting the output of the transducer, a detector, means for feeding the so shunted output of the transducer under test to said detector, a gated phase comparator, means for feeding the output of the detector to said gated phase comparator, said comparator being connected to and under control of the multivibrator and effective to transmit pulses only during the time the high frequency gated amplifier transmits bursts and coincidently when no negative going pulse from the detector output is applied to the comparator, an indicator, and means for feeding the output of said gated phase comparator to said indicator.

12. A transducer frequency response tester comprising a low frequency oscillator, a high frequency oscillator, means for adjusting the outputs of the oscillators to enable the output voltage of the low frequency oscillator to be made lower in magnitude than that of the high frequency oscillator, a pair of gated amplifiers connected respectively with said oscillators, a bi-stable multi-vibrator connected to the gated amplifiers, a trigger connected to the multi-vibrator to operate the same whereby oscillator bursts, in alternation from each of the oscillators, may be passed through the amplifiers, means for transmitting to a transducer under test the alternating bursts of oscillations with the low frequency voltage lower in magnitude than the high frequency voltage, a high resistance in series in said transmitting means, a low value resistor shunting the output of the transducer, a detector, means for feeding the so shunted output of the transducer under test to said detector, a detector short circuiting switch connected with the trigger to be operated each time the trigger operates on the multivibrator, whereby the detector is cleared for successive bursts of oscillations, a gated phase comparator, means for feeding the output of the detector, as affected by the switch, to said gated phase comparator, and a utilization device operated by said comparator, said comparator being connected to and under control of the multivibrator and effective to energize said utilization device only during the time that a certain one of said gated amplifiers transmits bursts and when no negative going pulse from the detector output, modified by the switch, is applied to the comparator.

13. A transducer tester comprising a low frequency oscillator, a high frequency oscillator, means including two gated amplifiers, connected one each to the two oscillators for gating the outputs of these oscillators into a common line, means for applying the gating alternate outputs to a transducer under test, means for deriving from the transducer, in alternation, two A.-C. voltages corresponding to the two frequencies applied to the transducer and of magnitudes corresponding with the frequency response of the transducer, means for rectifying the two voltages, means located between the oscillators and the rectifier for depressing the low frequency oscillation from its value when a state of equality of output of the oscillators exists, a push-pull gated amplifier, means pulsing one side of said push-pull gated amplifier simultaneously with the gating of one of the two gated amplifiers, means pulsing the other side of said push-pull gated amplifier simultaneously with the gating of the other of the two gated amplifiers, an indicator, and means conducting the output of the push-pull gated amplifiers to said indicator.

14. A transducer frequency response tester comprising a low frequency oscillator, a high frequency oscillator, means to equalize the outputs of the oscillators, means to feed the equalized oscillator outputs respectively to a pair of like gated amplifiers, means to gate the pair of amplifiers in alternation to enable bursts of oscillations from the low and high frequency oscillators to pass therethrough, means to conduct these bursts, still of equal magnitude, but in alternation, to a transducer under test, a broad band amplifier, means conducting the low and high frequency output from the transducer under test to said broad band amplifier, means within the broad band amplifier discriminating against the low frequency transducer output to reduce the magnitude of the same, means for detecting the output from the broad band amplifier, a push-pull amplifier, means for feeding the detected output to said push-pull amplifier, means gating one side of said gated push-pull amplifier simultaneously with the gating of one of the pair of gated amplifiers, means gating the other side of said gated push-pull amplifier simultaneously with the gating of the other of the phase amplifiers, an indicator, and means conducting the output of the push-pull gated amplifiers to said indicator.

15. A transducer frequency response tester comprising a low frequency oscillator, a high frequency oscillator, means to equalize the outputs of the oscillators, means to feed the equalized oscillator outputs respectively to a pair of like gated amplifiers, means to gate the pair of amplifiers in alternation to enable bursts of oscillations from the low and high frequency oscillators to pass therethrough, a high value resistor, means to conduct these bursts, but in alternation to said high value resistor and thence to the transducer under test, a low impedance shunt across the output of the transducer, a broad band amplifier, means for conducting the signal at the output of the transducer to said broad band amplifier, means within the broad band amplifier unfavorable to the low frequency transducer output to reduce the magnitude of the same, means for detecting the output from the broad band amplifier, a gated push-pull amplifier, means for feeding the detected output to said gated push-pull amplifier, said push-pull amplifier including two amplifiers, means pulsing one of said push-pull gated amplifiers simultaneously with the gating of one of the gated amplifiers, means pulsing the other of said push-pull amplifiers simultaneously with the gating of the other of the gated amplifiers, an indicator, and means conducting the output of the push-pull gated amplifiers to said indicator.

16. A transducer frequency response tester comprising a low frequency oscillator, a high frequency oscillator, means for adjusting the outputs of the oscillators to enable the voltages of the outputs to be equal in magnitude, means for transmitting to a transducer under test, in alternation, the equal voltage outputs, a detector, means for feeding the output of the transducer under test to said detector, means between the transducer under test and the detector for depressing the low frequency output of the transducer so that it is 3 db down from its value when made equal to the high frequency voltage, a gated phase responsive device, means for feeding the output of the detector to said gated phase responsive device, means for gating the outputs of the oscillators in synchronism with the gating of the phase responsive device, an indicator, and means for feeding the output of said phase responsive device to said indicator.

References Cited in the file of this patent
UNITED STATES PATENTS 2,525,675    Heller                Oct. 10, 1950
2,626,980    Balde                 Jan. 27, 1953

OTHER REFERENCES

"Transmission Measuring System," Bell Laboratories Record, pp. 264–268, vol. XXIX, No. 6, June 1951.